(12) United States Patent
Elangovan et al.

(10) Patent No.: US 10,562,496 B1
(45) Date of Patent: Feb. 18, 2020

(54) SYSTEM AND METHOD FOR DEVICE DISCOVERY IN NOISY ENVIRONMENT

(71) Applicant: Ford Global Technologies, LLC, Dearborn, MI (US)

(72) Inventors: Vivekanandh Elangovan, Canton, MI (US); Tom Nelson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/269,350

(22) Filed: Feb. 6, 2019

(51) Int. Cl.
*B60R 25/24* (2013.01)
*G07C 9/00* (2006.01)
*H04W 4/80* (2018.01)
*H04W 4/40* (2018.01)

(52) U.S. Cl.
CPC ........ *B60R 25/245* (2013.01); *G07C 9/00309* (2013.01); *H04W 4/40* (2018.02); *H04W 4/80* (2018.02); *G07C 2009/00547* (2013.01); *G07C 2209/63* (2013.01)

(58) Field of Classification Search
None
See application file for complete search history.

(56) References Cited

U.S. PATENT DOCUMENTS

| | | |
|---|---|---|
| 8,847,730 B2 | 9/2014 | Katou |
| 10,021,511 B2 | 7/2018 | Jeon |
| 2014/0087665 A1 | 3/2014 | Yang |
| 2014/0343753 A1 | 11/2014 | Kirsch |
| 2018/0050662 A1 | 2/2018 | Sanji et al. |
| 2018/0103414 A1 | 4/2018 | Golsch |

*Primary Examiner* — Carlos Garcia
(74) *Attorney, Agent, or Firm* — Frank Lollo; Eversheds Sutherland (US) LLP

(57) ABSTRACT

A vehicle includes antennas, memory, and processors. The processors are operable to execute a PEPS feature in association with a designated mobile device. Prior to causing the antennas to scan for the designated mobile device, the processors dynamically adjust a maximum number of wireless devices detectable by the antennas based on a total number of wireless devices that are currently wirelessly coupled to the antennas.

24 Claims, 4 Drawing Sheets

SYSTEM AND METHOD FOR DEVICE DISCOVERY IN NOISY ENVIRONMENT

TECHNICAL FIELD

The present disclosure generally relates to a system and method for device discovery in a noisy environment and, more specifically, a vehicle system and method for detecting a phone-as-a-key (PaaK) device in a noisy environment.

BACKGROUND

Passive Entry and Passive Start (PEPS) feature allows a vehicle to automatically unlock its doors and activate its ignition when a PaaK device is detected by said vehicle. While the PEPS feature may provide user convenience, the process for detecting the PaaK device may be burdensome when the vehicle is disposed in a noisy environment.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example vehicle and method are described herein. The example vehicle includes antennas, memory, and processors. The processors execute a PEPS feature in association with a designated mobile device. Prior to causing the antennas to scan for the designated mobile device, the processors dynamically adjust a maximum number of wireless devices detectable by the antennas based on a total number of wireless devices that are currently wirelessly coupled to the antennas.

The example method includes executing a passive entry passive start (PEPS) feature in association with a designated mobile device, and prior to scanning for the designated mobile device with a vehicle antenna, dynamically adjusting a maximum number of wireless devices detectable by the vehicle antennas based on a total number of wireless devices that are currently wirelessly coupled to the vehicle antennas.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
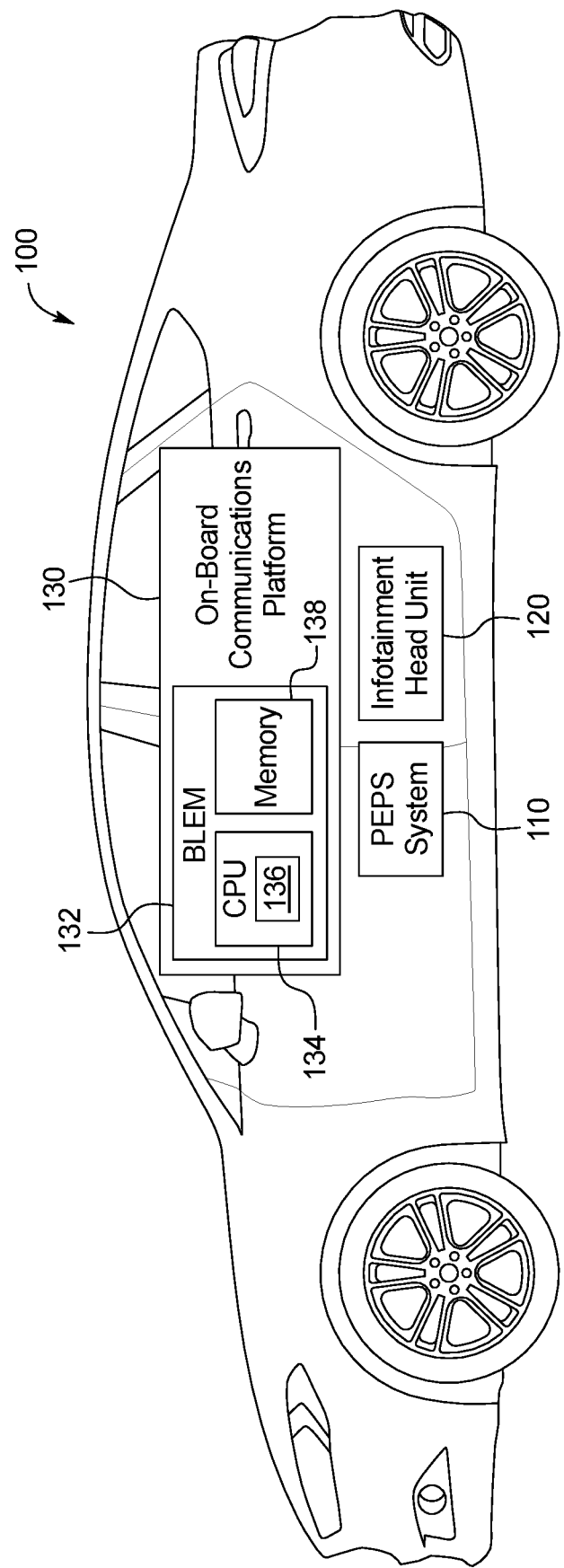
FIG. 1 illustrates a vehicle system in accordance with this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Modern vehicles include PEPS systems that allow users to access a vehicle and automatically activate the ignition thereof without using a key. The PEPS systems may utilize the PaaK systems to: (1) establish a communication with the mobile device; (2) verify the user associated with the mobile device; and (3) automatically provide access to the vehicle cabin and/or automatically activate the vehicle ignition based on the verification and/or location of the mobile device. The PaaK system allows the use of a mobile device to perform traditional key fob functions such as unlock, lock, remote start, lift gate access, mobilization authorization, etc. Typically, communications between the PaaK device and the PEPS systems are established via Bluetooth Low Energy (BLE) communication protocol. In the BLE communication protocol, a first BLE device advertises a signal and a second BLE device scans for the advertised signal. Once the second BLE device identifies the signal, the first and the second BLE devices are wirelessly linked. In vehicle systems, a Bluetooth Low Energy Module (BLEM) function as the second BLE device that scans for the advertised signal. While the BLEM enables a PaaK device to be wirelessly coupled to the PEPS systems of a vehicle, it may be challenging for the BLEM to identify the advertised signal when the vehicle is disposed in a noisy environment (e.g., a BLE congested area). Since the rate in which a BLE compatible mobile device advertises its signal (i.e., an advertisement interval) is generally fixed, the BLEM may take a substantial amount of time and effort to search and identify the PaaK device. Therefore, there is a need for optimizing the search for the PaaK device in a noisy environment.

As disclosed below, a vehicle includes a BLEM that alters the maximum number of BLE compatible devices that may be scanned within a given period. The BLEM dynamically alters said maximum number based at least in part on: (1) a number of BLE compatible devices that are currently linked to the BLEM; (2) at least one processing resource currently used by the BLEM (e.g., random access memory); and (3) contextual data received from external sources. The contextual data may be indicative of a population density of a local area in which the vehicle is disposed and one or more events occurring within the local area. By dynamically altering the maximum number, the BLEM increases the likelihood in which the PaaK device is scanned by the BLEM, thus, reducing an average amount of time for searching the PaaK device. The BLEM may further facilitate the search for the PaaK device by whitelisting the PaaK device. Specifically, the BLEM stores a Universal Unique Identifier (UUID) of the PaaK device in a secured database to whitelist the PaaK device. Thus, when the PEPS feature is utilized, the PaaK device broadcasts a ping including the UUID and the BLEM readily identifies the PaaK based on the UUID thereof. The PaaK device may be whitelisted by the BLEM subsequent to an initial pairing between the PaaK device and the BLEM. Alternatively or additionally, a user may manually provide inputs via a vehicle user interface to whitelist the PaaK device.

FIG. 1 illustrates a vehicle system in accordance with this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be a semi-autonomous vehicle (e.g., some routine motive functions, such as parking, are controlled by the vehicle 100), or an autonomous vehicle (e.g., motive functions are controlled by the vehicle 100 without direct driver input). In this illustrated example, the vehicle 100 includes a PEPS system 110, an infotainment head unit 120, and an on-board communications platform 130. The PEPS system 110, the infotainment head unit 120, and the on-board communications platform 130 may be communicatively coupled to each other via at least one vehicle bus and/or via a wireless system (not illustrated).

The PEPS system 110 may be embodied in at least one electronic control unit (ECU). The PEPS system 110 may be communicatively coupled with vehicle ignition systems and vehicle door access systems. The PEPS system 110 may: (1) communicate with the on-board communications platform 130 to verify a PaaK device; and (2) based on the verification, instruct the vehicle ignition systems to automatically activate and vehicle door access systems to automatically unlock one or more vehicle doors. The PEPS system 110 may cause the vehicle's ignition to automatically activate and/or cause one or more vehicle doors to unlock when the PaaK device is within a predetermined distance from the vehicle 100 and/or a vehicle door handle and/or vehicle start button is actuated.

The infotainment head unit 120 provides an interface between the vehicle 100 and a user. The infotainment head unit 120 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 120 includes hardware (e.g., a processor or controller, memory, storage, etc.) and software (e.g., an operating system, etc.) for an infotainment program (such as SYNC® and MyFord Touch® by Ford®, Entune® by Toyota®, IntelliLink® by GMC®, etc.). Additionally, the infotainment head unit 120 displays the infotainment program on, for example, the center console display.

The on-board communications platform 130 includes wired or wireless network interfaces to enable communication with external networks. The external network(s) may be a public network, such as the Internet; a private network, such as an intranet; or combinations thereof, and may utilize a variety of networking protocols now available or later developed including, but not limited to, TCP/IP-based networking protocols, 4G broadband cellular network, Long-Term Evolution (LTE) wireless communication, etc. The on-board communications platform 130 also includes hardware (e.g., processors, memory, storage, antenna, etc.) and software to control the wired or wireless network interfaces. The on-board communications platform 130 further includes one or more communication controllers for establishing standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the on-board communications platform 130 includes a wired or wireless interface (e.g., an auxiliary port, a Universal Serial Bus (USB) port, a Bluetooth wireless node, etc.) to communicatively couple with a mobile device (e.g., a smart phone, a smart watch, a tablet, etc.). In the illustrated example, the on-board communications platform 130 includes a BLEM 132. The BLEM 132 may establish a wireless connection with one or more BLE compatible mobile devices. The BLEM 132 implements the Bluetooth and/or BLE protocols as set forth in the Bluetooth Specification 5.0 (and subsequent revisions) maintained by the Bluetooth Special Interest Group. The BLEM 132 includes a processor or controller 134 and memory 138. In the illustrated example, the BLEM 132 is structured to include a device connection controller 136. Alternatively, in some examples, the device connection controller 136 may be incorporated into another ECU with its own processor and memory. The processor or controller 134 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 138 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 138 includes multiple kinds of memory, particularly volatile memory and non-volatile memory.

The memory 138 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 138, the computer readable medium, and/or within the processor 134 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

Details of the device connection controller 136 will be described in detail below. The device connection controller 136 sets the maximum number of BLE compatible devices that may be scanned within a given period. The device connection controller 136 further adjusts said maximum number based on the processing resource currently used by the BLEM 132. For example, as the amount of RAM usage in the memory 138 increases, the device connection controller 136 lowers the maximum number, vice-versa. It should be appreciated that the maximum number may be adjusted based on other processing resources currently used by the BLEM 132. For example, other processing resources may include CPU utilization of the processor 134. In some examples, the device connection controller 136 may adjust the maximum number based on a number of BLE compatible devices that are currently linked to the BLEM 132. For example, as the number of BLE compatible devices currently linked to the BLEM 132 increases, the device connection controller 136 lowers the maximum number, vice-versa. It should be appreciated that the number of BLE compatible devices that are currently linked to the BLEM 132 directly correlates to the current amount of processing resources used by the BLEM 132. Since the device connection controller 136 dynamically alters the maximum number based on the current amount of processing resources used by the BLEM 132 and the number of BLE compatible device currently linked to the BLEM 132, the BLEM 132 maximizes the likelihood in which the PaaK device is identified within the given period without interrupting any current operations performed by the BLEM 132. It should be appreciated that the device connection controller 136 may prioritize maintaining/reserving processing resources within the BLEM 132 for all BLE compatible devices currently linked to the BLEM 132 and use the remaining processing resources within the BLEM 132 for setting the maximum number. The device connection controller may adjust the maximum number while the PaaK device is attempting to establish initial communication with the BLEM 132. It should be appreciated that the device connection controller may adjust the maximum number during other instances.

In some examples, the device connection controller 136 adjusts the maximum number based on contextual data received from external sources. For example, the vehicle may provide, to an external server, GPS location of the vehicle's current location. The external server, in response, provides contextual data related to the vehicle's current location. The contextual data may be indicative of a population density of a local area in which the vehicle is disposed. For example, the population density may be determined based on the number of active mobile devices within the local area. The contextual data may further include a list of events occurring within the local area, a number of attendees attending each of the events, and other data sets indicative of BLE congestions within the local area. If the contextual data suggests that the local area includes a high population density, the device connection controller 136 increases the maximum number. If the contextual data suggests that a concert or a sports game is currently occurring within a stadium near the vehicle 100, the device connection controller 136 increases the maximum number.

In some examples, the device connection controller 136 may further facilitate the search for the PaaK device by whitelisting the PaaK device. When the device connection controller 136 whitelists the PaaK device, the device connection controller 136 stores a UUID of the PaaK in a secured database (e.g., memory 138 and/or an external server). The UUID is a 128-bit number used to identify information in computer systems. The UUID is uniquely assigned for each mobile devices registered in the list. Thus, when the PEPS feature is utilized, the PaaK device broadcasts a ping including the UUID and the BLEM 132 readily identifies the PaaK device based on the UUID thereof, thus, minimizing delay for identifying the PaaK device. The PaaK device may be whitelisted by the BLEM 132 subsequent to an initial pairing between the PaaK device and the BLEM 132. Alternatively or additionally, a user may manually provide inputs via a vehicle user interface to whitelist the PaaK device. In some examples, a user may initiate a connection setup to whitelist the PaaK device from a different mobile device or a personal computer via the cloud. In some examples, for security purposes, the device connection controller 136 may randomly alter the media access control (MAC) address of the BLEM 132 and the PaaK device for each predetermined intervals (e.g., 15 minutes). In such examples, since the whitelisting properties, in accordance with the Bluetooth Specification, account for randomized changes to the MAC address, the process in which the BLEM 132 scans for the PaaK device is not affected by said randomized changes when the PaaK device is whitelisted by the BLEM 132. In some examples, once the PaaK device is whitelisted by the device connection controller 136, the device connection controller 136 may cause the BLEM 132 to search for the PaaK device without adjusting the maximum number and/or a time window in which the BLEM 132 searches for the PaaK device. It some examples, the device connection controller 136 may adjust the maximum number and/or a time window in which the BLEM 132 searches for the PaaK device while the BLEM 132 is searching for a whitelisted mobile device.

Figure 2:
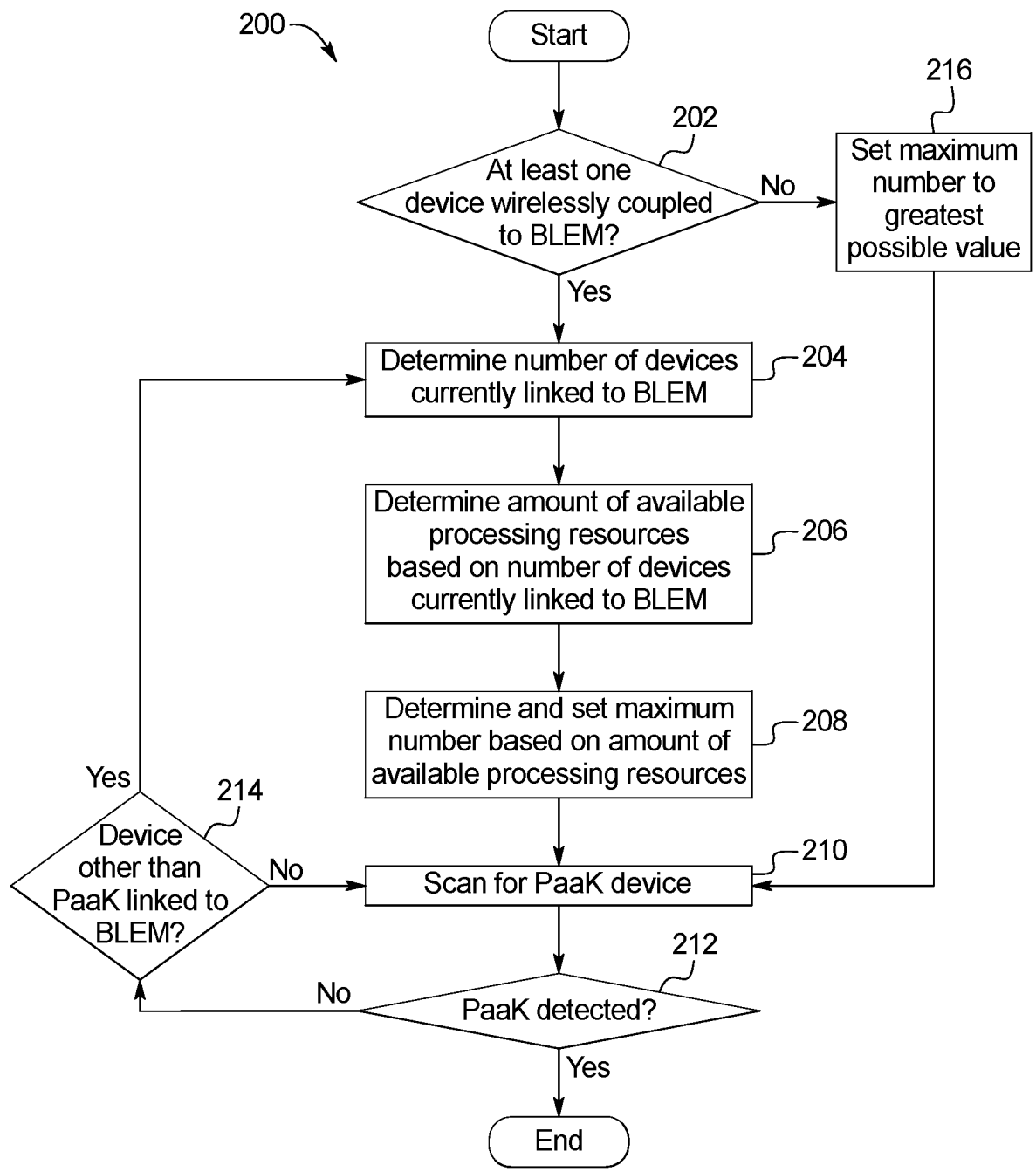
FIG. 2 illustrates a first flow chart of a method for detecting a PaaK.

FIG. 2 illustrates a first flow chart 200 of a method for detecting a PaaK device, which may be implemented by the vehicle of FIG. 1. The first flow chart 200 may occur during an initial pairing between the PaaK device and the BLEM 132.

At block 202, the device connection controller 136 determines whether at least one device is wirelessly coupled to the BLEM 132. If so, the method continues to block 204. Otherwise, the method continues to block 216.

At block 204, the device connection controller 136 determines the total number of devices that are currently linked to the BLEM 132.

At block 206, the device connection controller 136 determines the total amount of processing resources available within the BLEM 132 based on the total number of devices that are currently linked to the BLEM 132.

At block 208, the device connection controller 136 determines and sets the maximum number of BLE compatible devices that can be scanned within a given period based on the total amount of processing resources available within the BLEM 132.

At block 210, the device connection controller 136 causes the BLEM 132 to scan for the PaaK based on the set maximum number.

At block 212, the device connection controller 136 determines whether the PaaK device is detected. If so, the method terminates. Otherwise, the method continues to block 214.

At block 214, the device connection controller 136 determines whether a device other than the PaaK device has been linked to the BLEM 132. If so, the method returns to block 204. Otherwise, the method returns to block 210.

At block 216, the device connection controller 136 sets the maximum number to the greatest possible value. The greatest possible value may be defined by the total processing resources available within the BLEM 132.

Figure 3:
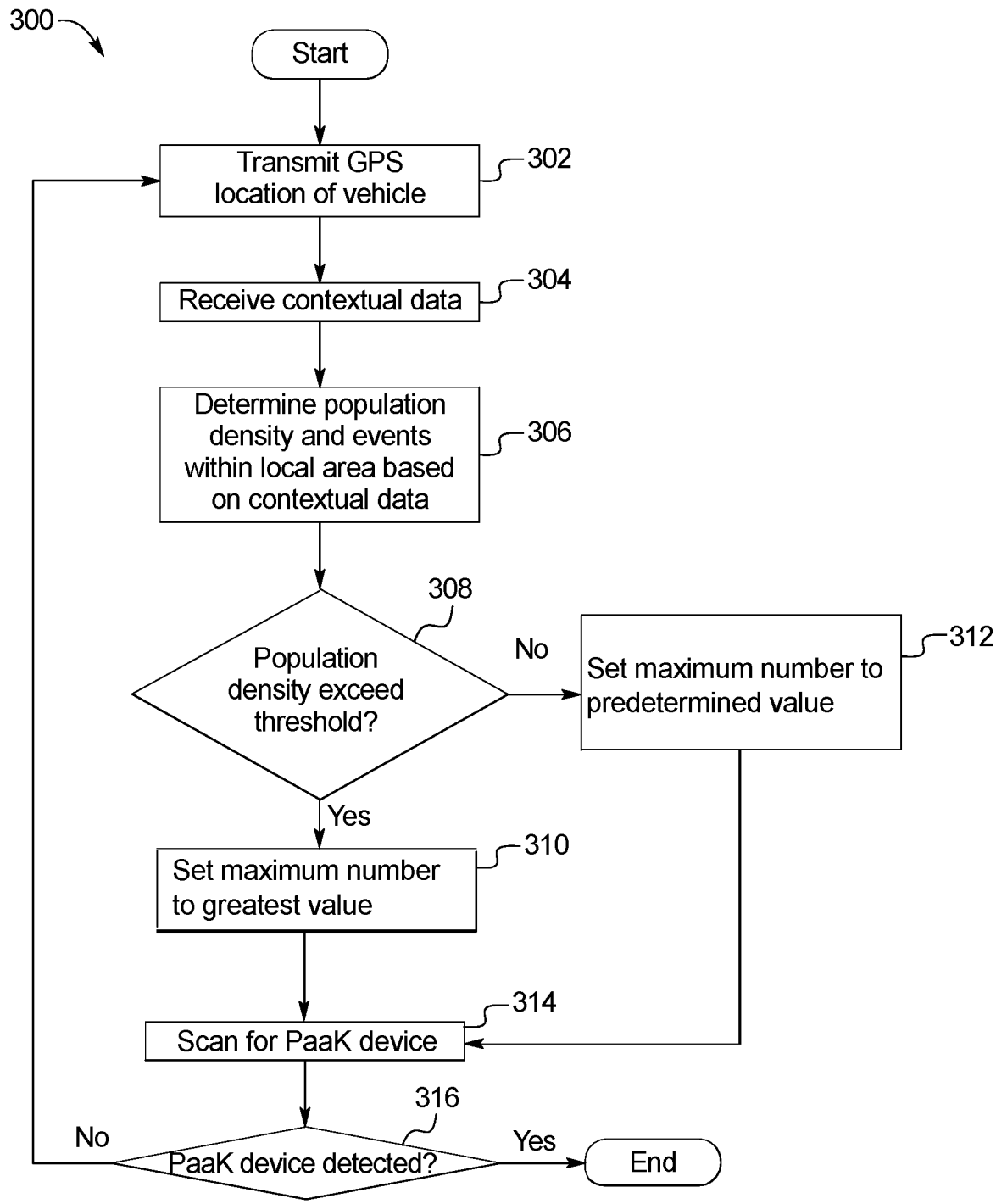
FIG. 3 illustrates a second flow chart of a method for detecting a PaaK.

FIG. 3 illustrates a second flow chart 300 of a method for detecting a PaaK, which may be implemented by the vehicle of FIG. 1. The second flow chart 200 may occur during an initial pairing between the PaaK device and the BLEM 132.

At block 302, the device connection controller 136 causes the on-board communication platform to transmit the GPS location of the vehicle to an external server.

At block 304, the device connection controller 136 receives, from the external server, contextual data of the local area surrounding the vehicle.

At block 306, the device connection controller 136 determines the population density of the local area and any significant events that are currently occurring within the local area. A significant event may be a concert, a sporting game, or any event that draws large amount of people.

At block 308, the device connection controller 136 determines whether the population density exceeds a threshold value. If so, the method continues to block 310. Otherwise, the method continues to block 312.

At block 310, the device connection controller 136 sets the maximum number that can be scanned within a given period to the greatest possible value.

At block 312, the device connection controller 136 sets the maximum number to a predetermined value. The predetermined value is less than the greatest possible value.

At block 314, the device connection controller 136 causes the BLEM 132 to scan for the PaaK device based on the set maximum number.

At block 316, the device connection controller 136 determines whether the PaaK device is detected. If so, the method terminates. Otherwise, the method returns to block 302.

Figure 4:
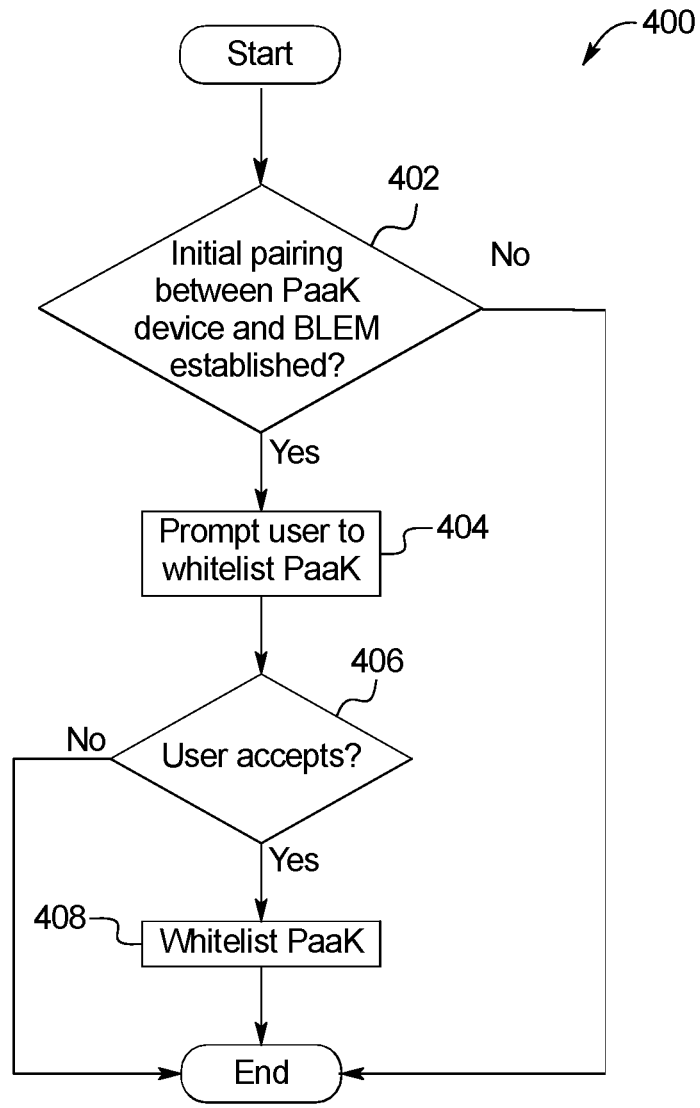
FIG. 4 illustrates a flow chart of a method for whitelisting a PaaK.

FIG. 4 illustrates a flow chart 400 of a method for whitelisting a PaaK device, which may be implemented by the vehicle of FIG. 1.

At block 402, the device connection controller 136 determines whether an initial pairing between the PaaK device and the BLEM 132 has been established. If so, the method continues to block 404. Otherwise, the method terminates.

At block 404, the device connection controller 136 causes the infotainment head unit 120 to provide a prompt to the user inquiring whether the user wishes to whitelist the PaaK.

At block 406, the device connection controller 136 determines whether the user wishes to whitelist the PaaK. If so, the method continues to block 408. Otherwise, the method terminates.

At block 408, the device connection controller 136 whitelists the PaaK.

At block 410, the device connection controller 136 determines whether the user has provided a manual input to whitelist the PaaK. If so, the method returns to block 408. Otherwise, the method terminates.

The flowcharts 200, 300, and 400 of FIG. 2-4 are representative of machine readable instructions stored in memory (such as the memory 138 of FIG. 1) that comprise one or more programs that, when executed by a processor (such as the processor 134 of FIG. 1), cause the vehicle 100 to implement the device connection controller 136 of FIG. 1. Further, although the example program(s) is/are described with reference to the flowcharts 200, 300, and 400 illustrated in FIGS. 2-4, many other methods of implementing the example device connection controller 136 may alternatively be used. For example, the order of execution of the blocks may be changed, and/or some of the blocks described may be changed, eliminated, and/or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
antennas;
memory; and
processors configured to:
execute a passive entry passive start (PEPS) feature in association with a designated mobile device; and
prior to causing the antennas to scan for the designated mobile device, dynamically adjust a maximum number of wireless devices detectable by the antennas based on a total number of wireless devices that are currently wirelessly coupled to the antennas.

2. The vehicle of claim 1, wherein the processors are further configured to dynamically adjust the maximum number of wireless devices detectable by the antennas based on an amount of processing resources required by the memory and the processors to maintain wireless connection with the total number of wireless devices.

3. The vehicle of claim 2, wherein at least one of the memory is a random access memory (RAM), and wherein at least one of the processing resources is RAM usage.

4. The vehicle of claim 1, wherein the processors are further configured to:
decrease the maximum number of wireless devices detectable by the antennas in response to detecting an increase in the total number of wireless devices that are currently wirelessly coupled to the antennas; and
increase the maximum number of wireless devices detectable by the antennas in response to detecting a decrease in the total number of wireless devices that are currently wirelessly coupled to the antennas.

5. The vehicle of claim 1, wherein the processors are further configured to:
transmit, via the antennas, location information of the vehicle to an external server;
receive, via the antennas, contextual data of a local area surrounding the vehicle; and
dynamically adjust the maximum number of wireless devices detectable by the antennas based on the contextual data.

6. The vehicle of claim 5, wherein the contextual data is indicative of a population density of the local area.

7. The vehicle of claim 5, wherein the contextual data is indicative of one or more events occurring within the local area.

8. The vehicle of claim 1, wherein the processors are further configured to, responsive to the designated mobile being whitelisted by the processors, cause the antennas to scan for the designated mobile device without adjusting the maximum number.

9. The vehicle of claim 8, further comprising a user interface, wherein the processors are further configured to, responsive to determining that an initial pairing between the designated mobile device and the vehicle has been established, cause the user interface to provide a prompt inquiring whether the designated mobile device should be whitelisted.

10. The vehicle of claim 8, wherein the processors are further configured to cause the antennas to scan for the designated mobile device using Bluetooth or Bluetooth Low Energy communication protocols.

11. The vehicle of claim 1, wherein the processors are further configured to, prior to causing the antennas to scan for the designated mobile device, scan, via the antennas, for a whitelisted mobile device.

12. The vehicle of claim 11, wherein the antennas are configured to dynamically adjust the maximum number of wireless devices detectable by the antennas while the processor is scanning for the whitelisted mobile device.

13. A method comprising:
  executing a passive entry passive start (PEPS) feature in association with a designated mobile device; and
  prior to scanning for the designated mobile device with vehicle antennas, dynamically adjusting a maximum number of wireless devices detectable by the vehicle antennas based on a total number of wireless devices that are currently wirelessly coupled to the vehicle antennas.

14. The method of claim 13, further comprising dynamically adjusting the maximum number of wireless devices detectable by the vehicle antennas based on an amount of processing resources required by vehicle memory and vehicle processors to maintain wireless connection with the total number of wireless devices.

15. The method of claim 14, wherein at least one of the processing resources is random access memory (RAM) usage.

16. The method of claim 13, further comprising:
  decreasing the maximum number of wireless devices detectable by the vehicle antennas for a predetermined period in response to detecting an increase in the total number of wireless devices that are currently wirelessly coupled to the vehicle antennas; and
  increasing the maximum number of wireless devices detectable by the vehicle antennas for the predetermined period in response to detecting a decrease in the total number of wireless devices that are currently wirelessly coupled to the vehicle antennas.

17. The method of claim 13, further comprising:
  transmitting, via the vehicle antennas, location information of a vehicle including the vehicle antennas to an external server;
  receiving, via the vehicle antennas, contextual data of a local area surrounding the vehicle; and
  dynamically adjusting the maximum number of wireless devices detectable by the vehicle antennas for the predetermined period based on the contextual data.

18. The method of claim 17, wherein the contextual data is indicative of a population density of the local area.

19. The method of claim 17, wherein the contextual data is indicative of one or more events occurring within the local area.

20. The method of claim 13, further comprising: responsive to the designated mobile device being whitelisted by a vehicle processor, causing the vehicle antennas to scan for the designated mobile device without adjusting the maximum number.

21. The method of claim 20, further comprising, responsive to determining that an initial pairing between the designated mobile device and the vehicle has been established, causing a vehicle user interface to provide a prompt inquiring whether the designated mobile device should be whitelisted.

22. The method of claim 20, further comprising causing the antennas to scan for the designated mobile device using Bluetooth or Bluetooth Low Energy communication protocols.

23. The method of claim 13, further comprising, prior to causing the antennas to scan for the designated mobile device, scanning, via the vehicle antennas, for a whitelisted mobile device.

24. The method of claim 23, further comprising dynamically adjusting the maximum number of wireless devices detectable by the vehicle antennas while a vehicle processor is scanning for the whitelisted mobile device via the vehicle antennas.

* * * * *